United States Patent [19]
Trotta et al.

[11] Patent Number: 5,094,198
[45] Date of Patent: Mar. 10, 1992

[54] AIR INTAKE HEATING METHOD AND DEVICE FOR INTERNAL COMBUSTION ENGINES

[75] Inventors: Paul M. Trotta; Paul J. Ebaugh; Donald T. Barnett, all of Columbus, Ind.

[73] Assignee: Cummins Electronics Company, Inc., Columbus, Ind.

[21] Appl. No.: 692,132

[22] Filed: Apr. 26, 1991

[51] Int. Cl.⁵ .............................................. F02P 19/00
[52] U.S. Cl. .................................. 123/179.21; 123/556
[58] Field of Search .................... 123/556, 179 H, 552, 123/549

[56] References Cited

U.S. PATENT DOCUMENTS

| | | |
|---|---|---|
| 3,423,569 | 1/1969 | Cappell et al. . |
| 4,089,214 | 5/1978 | Egami et al. . |
| 4,186,560 | 2/1980 | Frankl .................................. 60/599 |
| 4,207,848 | 6/1980 | Dinger et al. . |
| 4,367,700 | 1/1983 | Pace ...................................... 123/64 |
| 4,399,774 | 8/1983 | Tsutsumi ............................. 123/556 |
| 4,458,639 | 7/1984 | Abe et al. . |
| 4,466,393 | 8/1984 | Bell . |
| 4,506,145 | 3/1985 | Kawamura et al. ............. 123/179 H |
| 4,516,543 | 5/1985 | Abe et al. . |
| 4,545,357 | 10/1985 | Kearsley et al. .................... 123/556 |
| 4,625,910 | 12/1986 | Kawamura ........................... 237/556 |
| 4,635,594 | 1/1987 | Ichikawa et al. . |
| 4,658,772 | 4/1987 | Auth et al. ........................ 123/179 H |
| 4,669,430 | 6/1987 | Reinold et al. . |
| 4,681,070 | 7/1987 | Kurihara et al. ..................... 123/179 |
| 4,723,527 | 2/1988 | Panten ................................. 123/571 |
| 4,934,349 | 6/1990 | Demizu ............................. 123/179 H |
| 4,944,260 | 7/1990 | Shea et al. ........................... 123/179 |

OTHER PUBLICATIONS

Diesel Engine Reference Book edited by L. R. C. Lilly, Butterworth and Company Publishers 1984.

*Primary Examiner*—E. Rollins Cross
*Assistant Examiner*—M. Macy
*Attorney, Agent, or Firm*—Woodard, Emhardt, Naughton, Moriarty & McNett

[57] ABSTRACT

An air intake heating system and method for heating intake air for internal combustion engines is disclosed including a microprocessor based controller, intake manifold air temperature monitoring means, engine speed monitoring means, and electrical air heating elements actuated by the controller in response to various combinations of sensed engine speed, sensed intake manifold air temperature and sensed battery condition. Air intake heating is provided to assist cold weather starting of engines as well as for minimizing white smoke pollutants produced by diesel engines after starting of the engine and as required thereafter during engine operation.

34 Claims, 8 Drawing Sheets

AIR INTAKE HEATING METHOD AND DEVICE FOR INTERNAL COMBUSTION ENGINES

BACKGROUND OF THE INVENTION

This invention relates in general to internal combustion engines and more specifically to air intake heating systems for diesel engines which aid in cold weather starting and control white smoke exhaust omissions upon starting of the engine and as required thereafter during operation of the engine.

An undesirable phenomenon known as "white smoke" is a frequent side effect of no load or light load diesel engine operation at low temperatures. This phenomenon is essentially the result of unburned hydrocarbons in the engine exhaust and is attributable to misfiring or incomplete combustion in some or all cylinders. White smoke is both a respiratory and optical irritant as well as having an adverse affect upon visibility. While white smoke is not a regulated exhaust emission, sociability of the engine or vehicle suffers as a result of the production of white smoke.

In order to improve acceptance of small direct injection diesel engines used in marine applications, a means of cold starting and reducing white smoke is required during engine starting and thereafter during engine operation. The means for cold starting and reducing white smoke should be compatible with and make efficient use of the available power associated with a small direct injection diesel engine used in marine applications.

Various prior art devices have been employed to effect heat transfer to intake air of a diesel engine. A manifold heater system helps raise the temperature of the combustion air as intake manifold air passes through the intake manifold of the engine by means of an electrically heated element or a combustion burner using a liquid or gaseous fuel. One such electrical heating system is marketed by Robert Bosch, a German company, for use with direct injection engines of up to 2 liters displacement. See *Diesel Engine Reference Book* edited by L. R. C. Lilly, Butterworth and Company (Publishers) 1984.

An alternate device employed to improve cold starting characteristics of diesel engines is the glow plug device. A heating element or glow plug is located within each combustion chamber of the diesel engine. Each of the glow plugs is connected in parallel to the vehicle battery and power is supplied for 30 seconds or more to the glow plugs prior to starting the engine. The glow plug has the effect of heating the internal combustion area of the engine and improving starting performance when temperatures drop below the ambient temperature required for a diesel engine to ignite fuel. Glow plugs are manufactured by Robert Bosch in Germany, Delco Remy in the United States and the Lucas organization in Great Britain. Although an aid in cold starting, glow plugs do not reduce engine production of white smoke after starting.

U.S. Pat. No. 4,723,527 to Panten, et al. discloses an apparatus including a microprocessor controller for increasing inlet air temperature of an engine by way of exhaust gas recirculation techniques. Panten provides a postheat system for heating intake air after the vehicle engine is running. Pace, U.S. Pat. No. 4,367,700, discloses an electric resistance heating element for heating inlet air of an engine until a control unit senses a preset operating temperature of inlet air.

Pace does not address electrical power consumption limitations nor does Pace provide a systems approach for control of white smoke emissions. Dinger et al., U.S. Pat. No. 4,207,848, discloses a microprocessor controlled heat exchanger wherein heat from electrically heated water is transferred to intake air. The apparatus shown in U.S. Pat. No. 4,186,560 to Frankl includes a turbo-supercharger system which provides for diversion of compressed air through an air heater. The air heater in Frankl derives heat from the combustion of hydrocarbon fuels and transfers that heat to the compressed air flowing through the heat-exchanger. Kurihara et al., U.S. Pat. No. 4,681,070, discloses a suction gas heater control device for an engine which includes the capability to heat such gas for a predetermined period of time after the engine has been brought into stall after complete firing, thus facilitating engine restarting after stalling. Shea et al., U.S. Pat. No. 4,944,260, discloses an air intake heater system for internal combustion engines including a microprocessor controller, intake manifold air temperature sensing means, water in fuel sensors, and electrical air intake heating elements actuated by the microprocessor. Further air heating systems deriving heat from a running engine or combustible fuels to heat intake air are shown in patents to Kearsley et al., U.S. Pat. No. 4,545,357 (heating intake air), and Kawamura, U.S. Pat. No. 4,625,910 (heating air delivered into a passenger compartment).

An air intake heater system operational during both starting of an engine and as required thereafter during engine operation would enhance diesel engine applications. Such a system would provide effective cold start assistance as well as reduce white smoke pollutants from engine exhaust during both engine starting and running conditions.

SUMMARY OF THE INVENTION

An air intake heating system for use with an internal combustion engine having a battery and corresponding charging system according to one embodiment of the present invention includes temperature monitoring means for monitoring intake manifold air temperature and producing a temperature signal corresponding to the intake manifold air temperature, engine speed monitoring means for monitoring rotational speed of the engine and producing an engine speed signal corresponding to the rotational speed of the engine, and electrical air intake heating means for heating intake manifold air. A first circuit means responsive to the temperature signal and the speed signal produces a first heating signal when the temperature signal is below a predetermined preheat limit and the speed signal is below a predetermined cranking limit. A second circuit means responsive to the temperature signal and the speed signal produces a second heating signal when the temperature signal is below a predetermined postheat limit and the speed signal is above a predetermined running limit. A third circuit means responsive to the temperature signal and the speed signal produces a third heating signal when the temperature signal is below a predetermined recycle limit and the speed signal is above a predetermined running limit. A fourth circuit means responsive to the first, second and third heating signals supplies a power signal from the battery to the electrical air intake heating means in response to the first, second and third heating signals.

A method for heating intake manifold air of an internal combustion engine having a battery and corresponding charging system according to another aspect of the present invention is also disclosed. The method includes the steps of sensing intake manifold air temperature, sensing rotational speed of the engine, heating the intake manifold air when the sensed air temperature is below a predetermined preheat temperature and the sensed speed is below a predetermined cranking speed, heating the intake manifold air when the sensed air temperature is below a predetermined postheat temperature and the sensed speed is above a predetermined running speed, and heating the intake manifold air when the sensed temperature is below a predetermined recycle limit and the sensed speed is above a predetermined running speed.

One object of the present invention is to provide an improved method and apparatus for an air intake heating system for use with internal combustion engines.

Another object of the present invention is to provide an air intake heating system for reducing the amount of white smoke pollutants produced by the engine during both the starting phase, the warm-up phase and subsequent running of the engine.

Another object of the invention is to provide an air intake heating system which facilitates cold starting, reduces white smoke both during the starting phase, the warm-up phase and during subsequent operation of the engine, yet minimizes the consumption of power.

Related objects and advantages of the present invention will become apparent from the following description.

DESCRIPTION OF THE PREFERRED EMBODIMENT

Figure 1:
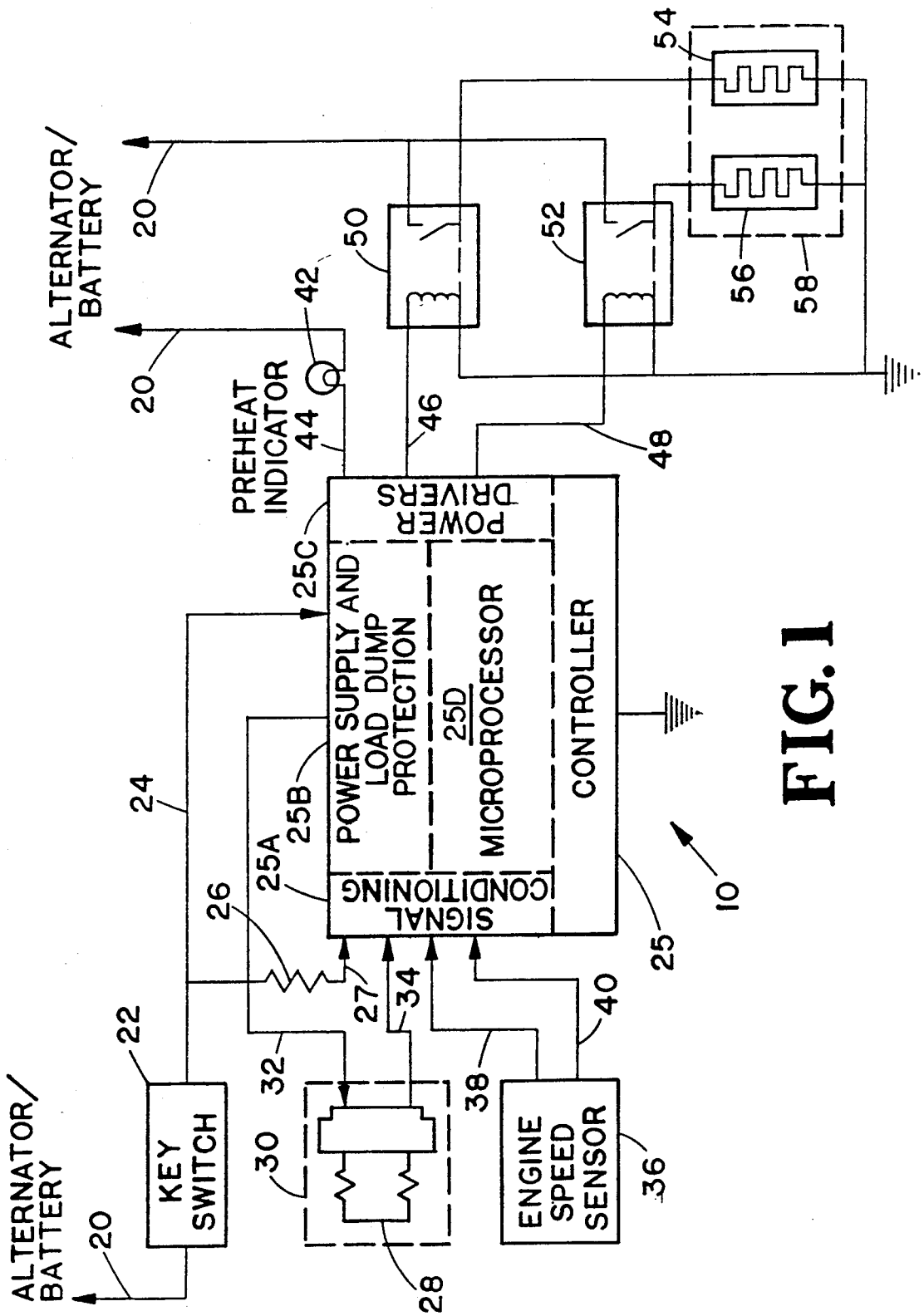
FIG. 1 is a diagrammatic illustration of an air intake heating system according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

Referring now to FIG. 1, a diagrammatic illustration of a microprocessor controlled air intake heating system 10 according to the present invention is shown. A battery/alternator power source signal is connected to the input of key switch 22 by signal path 20 hereinafter referred to as signal 20. Key switch 22 is a three position switch having an "off" position, a "run" position and a "crank" position. In the "off" position key switch 22 disconnects signal 20 from control module or controller 25. In the "run" position key switch 22 supplies power at 12 volts to controller 25 and resistor 26 by way of signal path 24. In the "crank" position key switch 22 further supplies power to an engine starter system (not shown). The three positions described above for key switch 22 correspond to those normally encountered in a motor vehicle wherein the key switch is initially placed in the "run" position to supply power to the electrical system of the vehicle and upon further rotation of the switch to the "crank" position a starter solenoid of the vehicle is engaged to start the engine.

In addition to the switched twelve volts supplied to controller 25 via signal path 24, signals corresponding to battery condition, engine speed and air intake temperature are supplied to inputs of controller 25. Controller 25 senses battery condition by monitoring the analog voltage present on signal path 27 which connects resistor 26 to controller 25. Signal path 27 communicates a voltage indicating battery condition to controller 25. Battery condition is monitored to determine if heating elements 54 and 56 should be energized. Acceptable battery condition or voltage hereinafter is defined as greater than 10.5 volts and less than 17.0 volts, plus or minus 7%.

Air temperature is monitored by controller 25 through thermistor 28. Thermistor 28 is located within intake manifold 30, represented by a broken line, downstream from heating elements 54 and 56. Elements 54 and 56 are located within air intake heating assembly 58, represented by a broken line. Thermistor 28 has a resistance which varies according to the air temperature within the intake manifold. Controller 25 supplies a reference signal via signal path 32 to thermistor 28 and receives a temperature signal or signal voltage via signal path 34 at an input of an analog to digital converter, the received voltage corresponding to the air intake temperature. The voltage across the thermistor is converted to a temperature by controller 25 to determine if preheat and/or postheat is required and to determine the duration of preheat. The thermistor is also used to determine if postheat should be recycled and to determine the duty cycle for the recycling of postheat; i.e., activation of a recycle mode of the controller wherein heating elements 54 and 56 are energized according to a variable duty cycle.

Engine speed sensor 36 supplies speed signals to controller 25 via signal paths 38 and 40. Engine speed sensor 36 is used to detect a cranking, running or warmed engine. A cranking engine is defined as one where the engine speed is greater than 40 revolutions per minute (RPM) and less than 600 RPM. A running engine is defined as one where the engine speed is greater than 600 RPM. A warmed engine is defined as one where the engine speed is greater than 1200 RPM. The running speed can vary within other embodiments according to the model of engine incorporating heating system 10. For example, characteristics of another engine model may require defining a "running engine" as having an engine speed greater than 350 RPM. A common controller design for use with multiple engine models is contemplated, the controller including alternate program data in EPROM for defining a running engine according to engine model.

Engine speed sensor 36 is a variable reluctance magnetic pick-up or sensor, Cummins part No. 3616371, available through Cummins Electronics Co., 2851 State St., Columbus, Ind. 47201. Sensor 36 produces a speed signal indicative of engine speed as the teeth of a gear rotating in synchronism with the engine pass near the sensor 36.

Controller 25 includes a microcontroller chip or microprocessor 25D, Motorola No. MC68HC705B5VP, having the following on-chip features: 176 bytes RAM, 6208 bytes of EPROM, a UART, a multiple channel analog to digital converter (A/D), a watchdog timer internal to the microcontroller chip, digital I/O, 2 input captures and 2 output compares. Further details and literature are available from Motorola Literature Distribution, P.O. Box 20912, Phoenix, Ariz. 85036. The Motorola MC68HC705B5VP is intended to operate as an OTP (One Time Programmable) version of the Motorola MC68HC05B6.

Controller 25 includes at least three digital logic level outputs which control various functions of the system. Two of the outputs of controller 25 control contactors or relays 50 and 52, respectively, via signal paths 46 and 48. Relays 50 and 52 switch power to the heating elements 54 and 56. The relays receive power signals from the controller via signal paths 46 and 48. The controller outputs connected to the relays 46 and 48 are short circuit protected.

The controller 25 operates on a +12 volts DC electrical system and receives power from the key switch 22 via signal path 24. The controller requires a minimum of +9 volts DC and a maximum of +16 volts DC to function properly. The controller also requires a maximum of 3.5 amps (correlating to both relays 50 and 52 on) and a minimum of 1.0 amps (correlating to both relays off) to function properly. Nominal current drain with both relays on is 1.5 amps. Controller 25 further includes power output drivers 25C, a DC power supply circuit 25B, negative transient and load dump protection circuitry 25B, and input signal conditioning circuitry 25A.

Heating elements 54 and 56 are located within the air intake heating assembly 58. Intake air is drawn in through assembly 58 and over elements 54 and 56 during engine operation. Each heating element is rated at 1300 watts. Signal path 20 connects relays 50 and 52 to a source of power such as the alternator/battery. When relays 50 and 52 are activated or energized battery power is supplied to the heating elements 54 and 56.

A third output signal from controller 25 on signal path 44 controls preheat indicator 42. Controller 25 sinks current on signal path 44 through preheat indicator 42 to illuminate the indicator. Preheat indicator 42 is an incandescent lamp which is connected to signal path 20, a source of power.

Operationally controller 25 upon receiving a power-up signal via signal path 24, (i.e., key switch 22 is switched to the "run" position from the "off" position) resets or initializes its program and begins to monitor the battery condition through resistor 26. If a condition outside of the acceptable battery limits is detected, heating elements 54 and 56 of heating assembly 58 are not energized or cycled.

After the controller has powered-up and detected on acceptable battery condition, the controller then checks the air intake temperature via the voltage across thermistor 28. If the sensed air intake temperature is less than or equal to 95° F., then the controller energizes both heating elements 54 and 56. Elements 54 and 56 are energized for a varying duration of time, the controller determining the duration according to the sensed air intake temperature. This first heating cycle provided prior to starting the engine is hereinafter referred to as the preheat cycle or preheat. If at any time during or prior to the preheat cycle the engine is cranked, preheat is aborted and heating elements 54 and 56 and indicator 42 are all deenergized. Neither of the heating elements are energized during cranking.

When the intake air temperature is tested by controller 25, the thermistor condition is checked as well. If a shorted thermistor is detected, the controller treats it as indicating a temperature greater than 95° F. (35° C.). If an open thermistor is detected (open being defined as greater than 475,000 ohms), preheat is provided. After preheat, however, the preheat indicator lamp is flashed at a rate of one cycle per second (1 Hz) with a 50% duty cycle ±15%.

During the preheat cycle preheat indicator 42 is illuminated and the operator should not start the engine until the lamp is extinguished by controller 25. Once the controller detects an engine speed greater than 600 RPM (running engine), the controller again tests battery condition and, if acceptable, the controller next tests the intake air temperature. If battery condition and engine speed are acceptable and the air temperature is less than or equal to 75° F., the controller turns on both heating elements for 20 seconds. This secondary heating cycle is hereinafter referred to as the postheat cycle or postheat.

If at any time during postheat the engine stalls, the controller aborts postheat; i.e., both relays 50 and 52 are turned off. If the engine stalls during or after postheat and is restarted, no postheat is provided, although the controller enters the recycle mode if required. If the key switch is moved to the off position and the intake manifold air temperature is within the appropriate range (see subsequent Table 1), preheat and postheat are provided due to system reset.

After postheat is completed, controller 25 verifies acceptable battery condition, verifies that the engine speed is greater than 600 RPM but less than 1200 RPM and inputs the intake air temperature. Because engines tend to produce less white smoke when warmed and higher engine speeds are typically indicative of a warmed engine, an upper limit on engine speed of 1200 RPM is included in the recycle mode to prevent unneeded and inefficient heating of intake air. If battery condition and engine speed are acceptable and the air intake temperature is less than or equal to 95° F., then the controller begins a heating cycle hereinafter referred to as the recycle mode or recycle. During recycle the heating elements 54 and 56 are supplied with varying power signals according to one of two different duty cycle signals as depicted in FIG. 2 and FIG. 2A.

Figure 2:
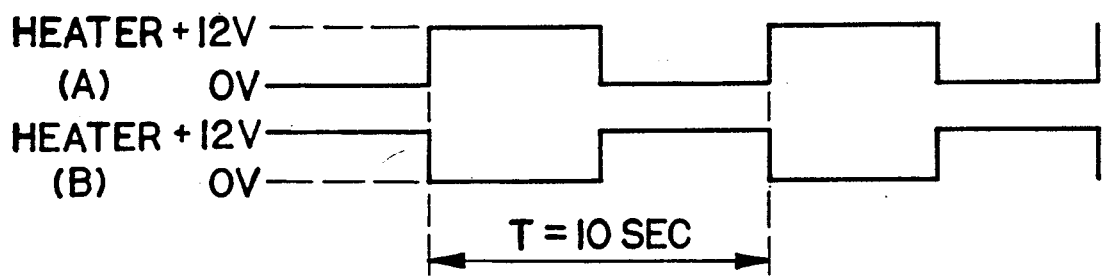
FIG. 2 is a graphical illustration of a 50 percent duty cycle for a recycle mode of the air intake heating system of FIG. 1.
Figure 2A:
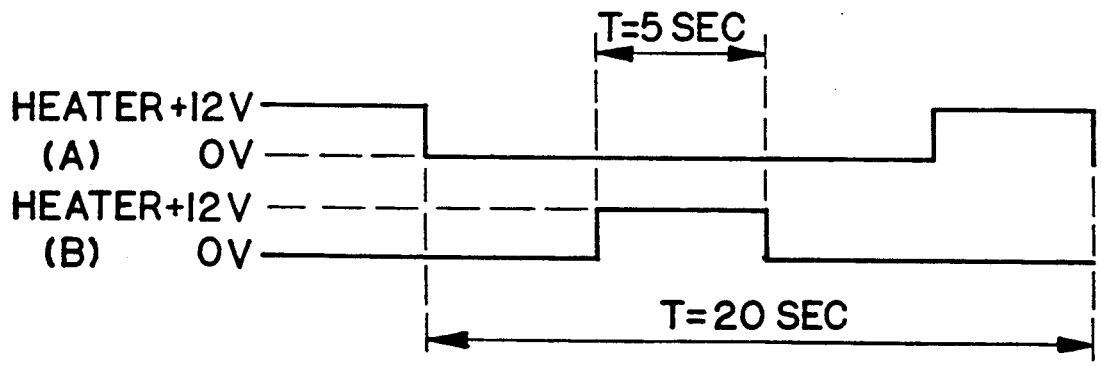
FIG. 2A is a graphical illustration of a 25 percent duty cycle for a recycle mode of the air intake heating system of FIG. 1.

During recycle, 50 percent duty cycle signals, as shown in FIG. 2, are supplied to heating elements 54 and 56 so that one heating element is always receiving a power signal until the air temperature sensed via thermistor 28 exceeds 75° F., battery conditions are violated or the engine (not shown) stalls (RPM less than 600) or exceeds 1200 RPM. Two 25 percent duty cycle signals, as shown in FIG. 2A, are supplied to heating elements 54 and 56 above an air inlet temperature of 75° F. The 25 percent duty cycle signals are supplied until the air temperature sensed via thermistor 28 exceeds 95° F., battery conditions are violated, the engine stalls or engine speed exceeds 1200 RPM. As an added measure to prevent inefficient heating of intake air, a total elapsed heating time of 20 minutes is also provided for in the recycle mode. If heating system 10 is in the recycle mode continuously for 20 minutes, heating elements 54 and 56 are deenergized until system 10 is reset; i.e., key switch 22 is cycled off and back on again.

The controller 25 can initiate the recycle mode any number of times after postheat is complete so long as battery conditions are acceptable, engine speed is greater than 600 RPM but less than 1200 RPM and intake air temperature is less than 95° F. Hysteresis is built into the recycle mode to prevent needless energizing and deenergizing of the heating elements when heating of intake air is not required. If low battery voltage conditions are detected during the recycle mode, recycle is aborted; i.e., both relays 50 and 52 are deenergized. The controller continues to monitor battery condition at this time. When the battery voltage exceeds 11.9 volts minimum, and engine speed as well as air temperature are within acceptable limits for recycle mode, then the controller delays sixty seconds and returns to the recycle mode. If four (4) battery condition violations occur during recycle, the heating elements are deenergized until the controller 25 is reset. Similarly, if intake air temperature exceeds 95° F. (35° C.) during recycle, the heating elements are deenergized until intake air temperature drops below 85° F. (30° C.) thus a 10° hysteresis band. If engine speed exceeds 1200 RPM, the heating elements are deenergized until engine speed drops below 1000 RPM, thus a 200 RPM hysteresis band.

Table 1 provides a suggested guide for energizing the heating elements 54 and 56, in response to sensed intake manifold air temperature. Based upon an initial manifold intake air temperature, preheat may be provided upon controller power-up. As can be seen from Table 1, if the intake air temperature is less than 95° F., preheat is provided, wherein the controller energizes both heating elements for 10, 15, or 20 second durations depending on the intake air temperature. For example, below 32° F. (0° C.) both heating elements are energized for 20 seconds during preheat. Below 75° F. postheat is provided following preheat, and the heating elements are energized for an additional 20 seconds.

TABLE 1

| Temp. | Mode | Heaters | Duration | % On/% Off |
|---|---|---|---|---|
| <32° F. | Preheat | Both | 20 seconds | Continuous |
| (<0° C.) | Postheat | Both | 20 seconds | Continuous |
| | Recycle | One | See Note | 50/50 |
| 32.1°-60° F. | Preheat | Both | 15 Seconds | Continuous |
| (.1°-15.5° C.) | Postheat | Both | 20 Seconds | Continuous |
| | Recycle | One | See Note | 50/50 |
| 60.1°-75° F. | Preheat | Both | 10 Seconds | Continuous |
| (15.1°-23° C.) | Postheat | Both | 20 Seconds | Continuous |
| | Recycle | One | See Note | 50/50 |
| 75.1°-95° F. | Preheat | Both | 10 Seconds | Continuous |
| (23.1°-35° C.) | Postheat | None | | |
| | Recycle | One | See Note | 25/75 |
| >95° F. | Preheat | None | | |

TABLE 1-continued

| Temp. | Mode | Heaters | Duration | % On/% Off |
|---|---|---|---|---|
| (>35° C.) | Postheat | None | | |
| | Recycle | None | | |

NOTE: If the intake air ambient temperature is equal to or less than 95° F. (35° C.), the controller cycles the heating elements per FIG. 2 and/or FIG. 2A until the intake air temperature exceeds 95° F. (35° C.).

Following preheat and/or postheat, recycle occurs wherein variable duty cycle capability in the form of one of two different duty cycle signals is supplied to the heaters. Below 75° F. (23° C.) recycle is provided at a 50 percent duty cycle, wherein the heating elements are alternately cycled on for 5 seconds and off for 5 seconds. Above 75° F. (23° C.) recycle is provided at a 25 percent duty cycle, wherein the heating elements are energized for 5 seconds and deenergized for 15 seconds according to FIG. 2A. As is shown in FIG. 2 and FIG. 2A, the heating elements are not simultaneously energized in order to minimize system loading on the engine electrical system. Above 95° F. no heating of intake air occurs.

The controller 25 tests battery voltage conditions before beginning the preheat and postheat cycles. The controller does not abort preheat or postheat if acceptable battery conditions are violated during the preheat or postheat cycles.

Figures 3, 4:
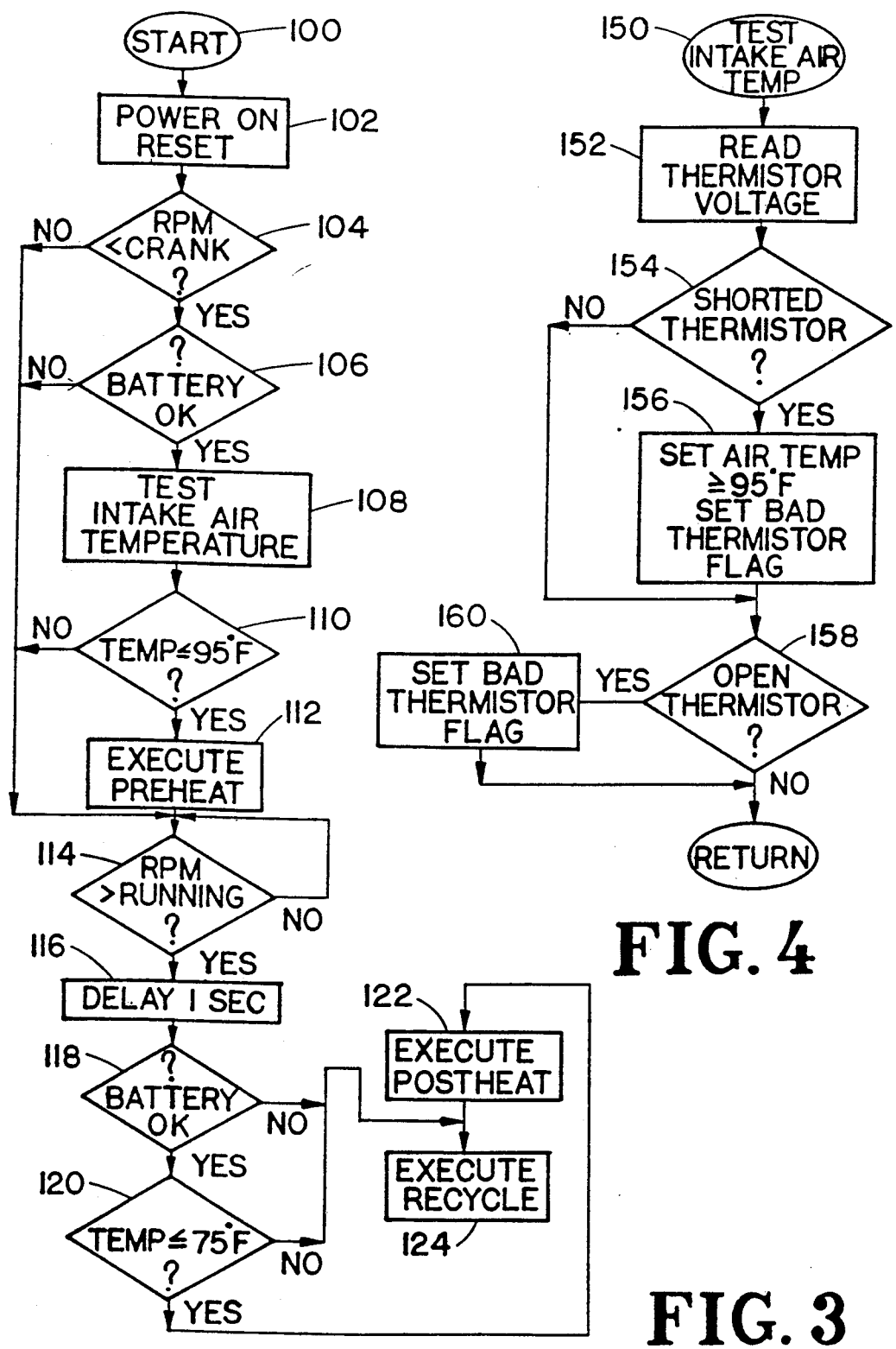
FIG. 3 is a flowchart of a software program executed by a microprocessor of the air intake heating system.
FIG. 4 is a flowchart of the test intake air temperature subroutine of FIG. 3.

Referring now to FIG. 3, a flowchart depicting the program stored in internal read only memory (ROM) of controller 25 is shown. The program begins at step 100. At step 102 the microprocessor executes a power-up routine and initializes the program. At step 104 engine speed is tested against a predetermined cranking limit. If the engine speed is less than 40 RPM, engine cranking has not occurred and program execution continues at step 106. If engine speed is greater than 40 RPM the program bypasses preheat and advances to step 114. At step 106 the microprocessor checks battery condition. If the battery voltage is less than or equal to 10.5 volts or greater than or equal to 17.0 volts, preheat is bypassed and program execution advances to step 114. If battery condition is acceptable at step 106, the program execution advances to step 108 to execute a test intake air temperature subroutine.

After testing intake air temperature at step 108, program execution advances to step 110. If at step 110 the intake air temperature is les than or equal to 95° F., then the preheat subroutine at step 112 is executed, wherein both heating elements are energized for a predetermined period of time, wherein the duration of energization is a function of inlet air temperature as shown in Table 1. After preheat, the operator turns the key switch to the "crank" position, holding the key in the "crank" position until the engine starts. After starting the engine the key is released into the "run" position. During this sequence, the controller waits at step 114 until it detects a running engine; i.e., engine speed detected is greater than 600 RPM. If engine speed is not greater than 600 RPM, then the program loops on itself at step 114.

After detecting a running engine, the controller delays one second at step 116 and tests battery condition at step 118. If battery voltage is not within the desired voltage range, program execution advances to step 124 bypassing postheat. If the sensed battery voltage is within the desired voltage range, program execution advances to step 120.

At step 120 the controller determines whether air intake temperature is less than or equal to 75° F. If the air temperature is greater than 75° F., program execution advances to step 124 to execute the recycle mode. If air temperature is less than or equal to 75° F. and the sensed battery condition is in the desired range, then program execution advances to step 122 and the postheat subroutine is executed, and both heating elements are turned on for 20 seconds.

After postheat (step 122) is completed, program execution enters the recycle mode of operation at step 124. Once in the recycle mode, the air intake heaters 54 and 56 are energized when air temperature falls below 95° F. and engine speed is between 600 and 1200 RPM.

Referring now to FIG. 4, a more detailed flowchart depicting the test intake air temperature subroutine of step 108 is shown. Beginning at step 150, program execution continues at step 152 where the thermistor voltage is input or read. The voltage on signal path 34 is quantized by controller 25, and provides a value indicative of intake manifold air temperature. In order to safeguard against possible equipment failure, at step 154 controller 25 determines whether the thermistor is "shorted" or short circuited.

If voltage is below a predetermined "shorted" value, the controller 25 determines that the thermistor is shorted and program execution advances to step 156 where a "bad thermistor" flag is set in memory and a variable in memory which corresponds to intake manifold air temperature is set to a value above 95° F. By setting the intake air temperature variable in memory above 95° F., postheat, preheat, and recycle are effectively bypassed in the execution of the software. If the thermistor is not shorted, program execution advances to step 158 where controller 25 determines whether thermistor 28 is open; i.e., a very high resistance on the order of 475,000 ohms. An open thermistor is determined by monitoring the voltage on signal path 34 for an excessively high voltage condition, typically a voltage above a predetermined maximum voltage which may be anticipated on signal path 34 as a result of an open thermistor. If thermistor 28 is open circuited, program execution advances to step 160 and a "bad thermistor" flag is set in memory prior to returning to the calling routine.

If neither a shorted thermistor nor an open thermistor are detected, program execution returns to the calling routine without executing steps 156 or 160. Execution of the test intake air temperature subroutine of FIG. 4 prior to preheat enables detection of a failed thermistor when the controller 25 is powered-up. Alternatively, subroutine 150 can be executed prior to each reading of intake air temperature, thereby testing for a failed thermistor each time the controller is powered-up and during subsequent inputting of the thermistor voltage.

Figure 5:
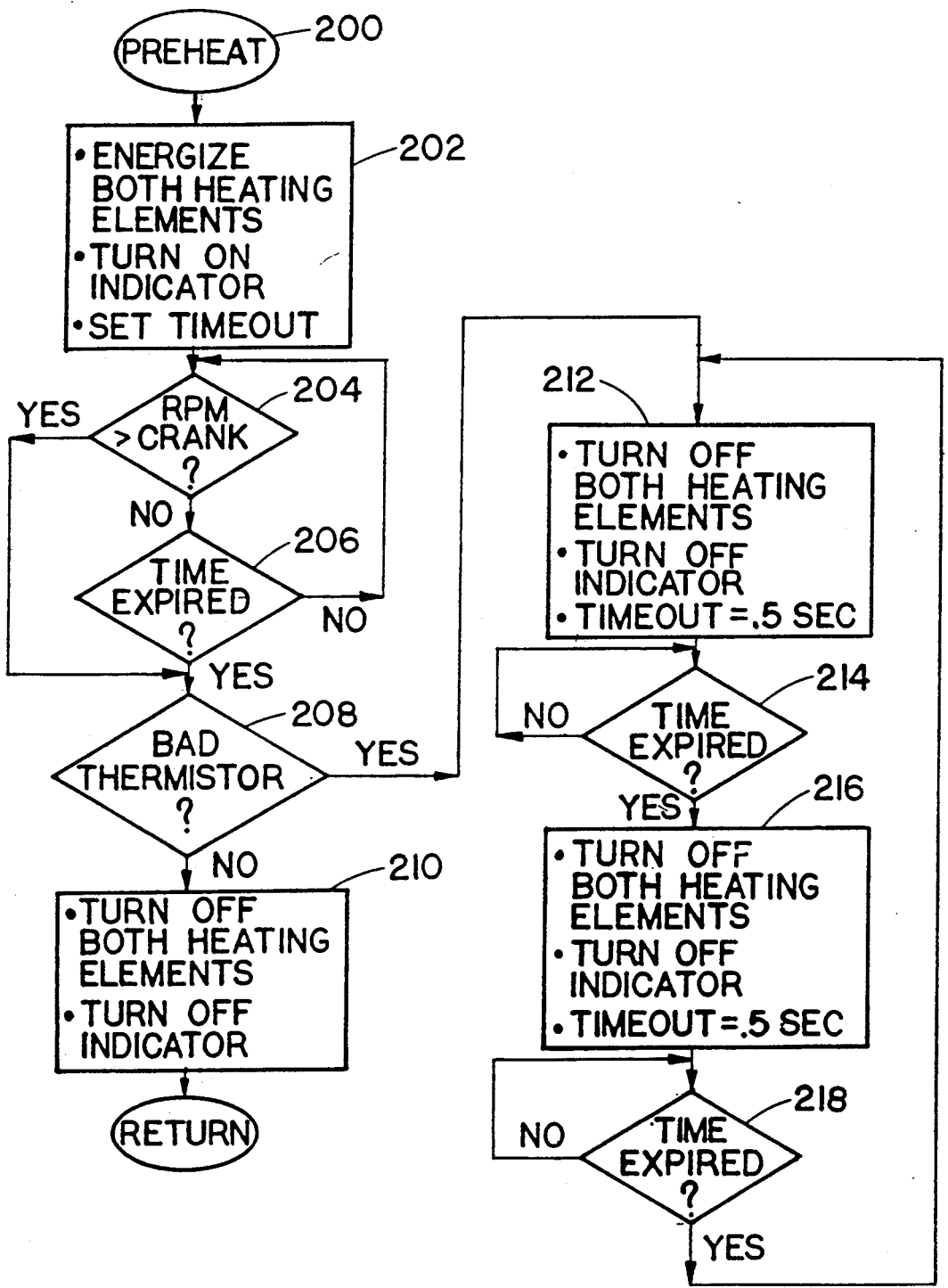
FIG. 5 is a flowchart of the preheat subroutine of FIG. 3.

Referring now to FIG. 5, a more detailed flowchart for the preheat subroutine of step 112 of FIG. 3 is shown. Program execution begins at step 200 and continues at step 202 where both heating elements 54 and 56 are energized and indicator lamp 42 is illuminated. Timeout is set equal to a duration period corresponding to the intake air temperature as provided for in Table 1. Program execution advances to step 204 where engine speed is tested. If engine speed is greater than 40 RPM (cranking detected) then program execution advances to step 208. If engine speed is not greater than 40 RPM, then program execution advances to step 206 to determine whether the timeout time period from Table 1 selected according to temperature has elapsed (i.e., if temperature = 65° F., then timeout = 10 seconds). If time has not expired, then program execution returns to step 204 where engine speed is again tested. When the selected preprogrammed time period has expired, program execution advances to step 208 where the controller checks for a "bad thermistor" flag indicating a bad thermistor was detected during execution of the test intake air temperature subroutine of FIG. 3. If a bad thermistor was not detected, program execution advances to step 210 where both heating elements are deenergized, the indicator light is extinguished, and program execution returns to the calling routine.

If at step 208 a bad thermistor has been detected, the controller intermittently flashes indicator light 42. At step 212 both heating elements are turned off and the indicator light is extinguished and a timeout is set at 0.5 seconds. The program loops on itself at step 214 until 0.5 seconds has elapsed. Program execution advances to step 216 where the controller deenergizes both heating elements, illuminates the indicator 42 and sets a timeout to 0.5 seconds. The program loops on itself at step 218 until the time elapsed equals 0.5 seconds and returns to step 212, thus creating a one Hertz flashing indicator light.

Figure 6:
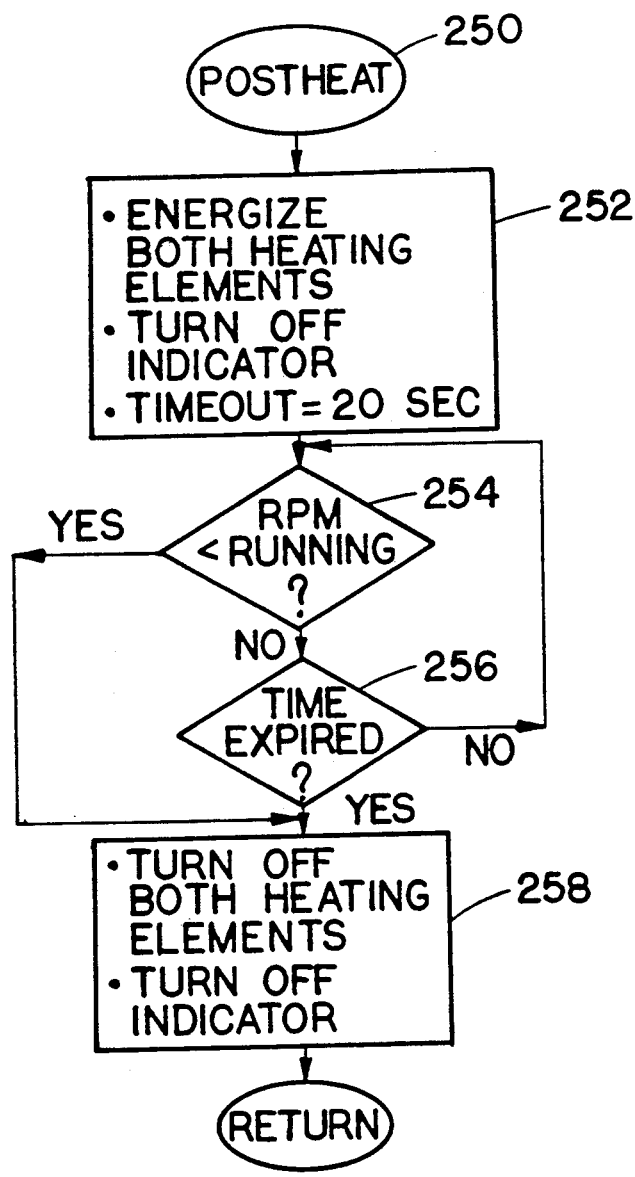
FIG. 6 is a flowchart of the postheat subroutine of FIG. 3.

Referring now to FIG. 6, a more detailed flowchart of the postheat subroutine step 122 is shown. Program execution begins at step 250 and continues at step 252 where both heating elements are energized, the indicator lamp is illuminated and a timeout timer is set to 20 seconds. Program execution continues at step 254 where engine speed is checked to determine whether the engine is running. If a cranking engine (RPM greater than 40) is detected, program execution advances to step 258 where both heating elements are deenergized. If engine speed is greater than 600 RPM, program execution advances to step 256 where the controller determines if the preset 20 second time period has expired. If time has not expired, program execution returns to step 254 to check engine speed, repeating the loop of steps 254 and 256 until 20 seconds has elapsed. Thereafter, program execution advances to step 258 where the controller deenergizes both heating elements and program execution returns to the calling routine.

Figure 7A:
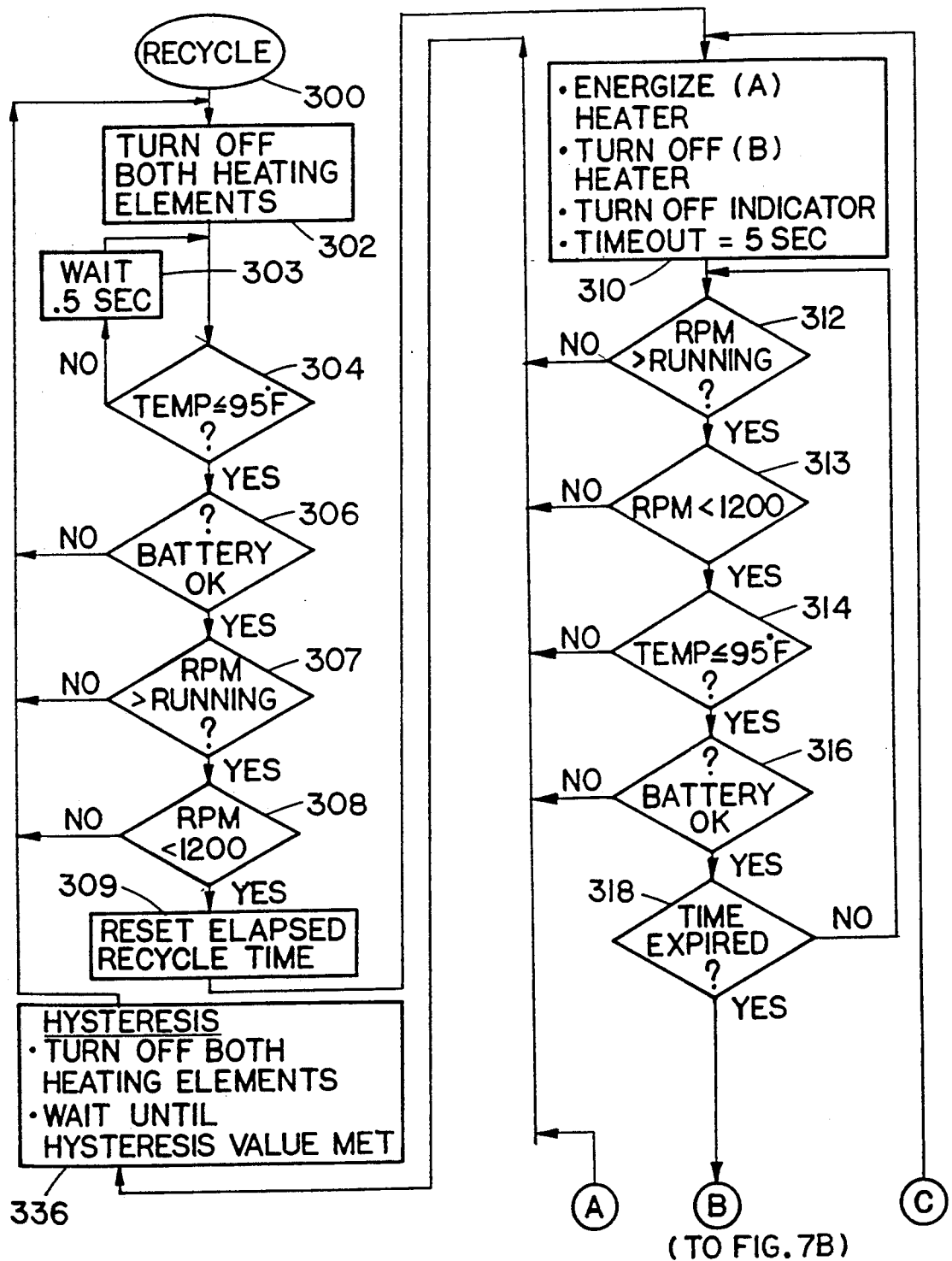
FIG. 7A is a flowchart of a portion of the recycle subroutine of FIG. 3.
Figure 7B:
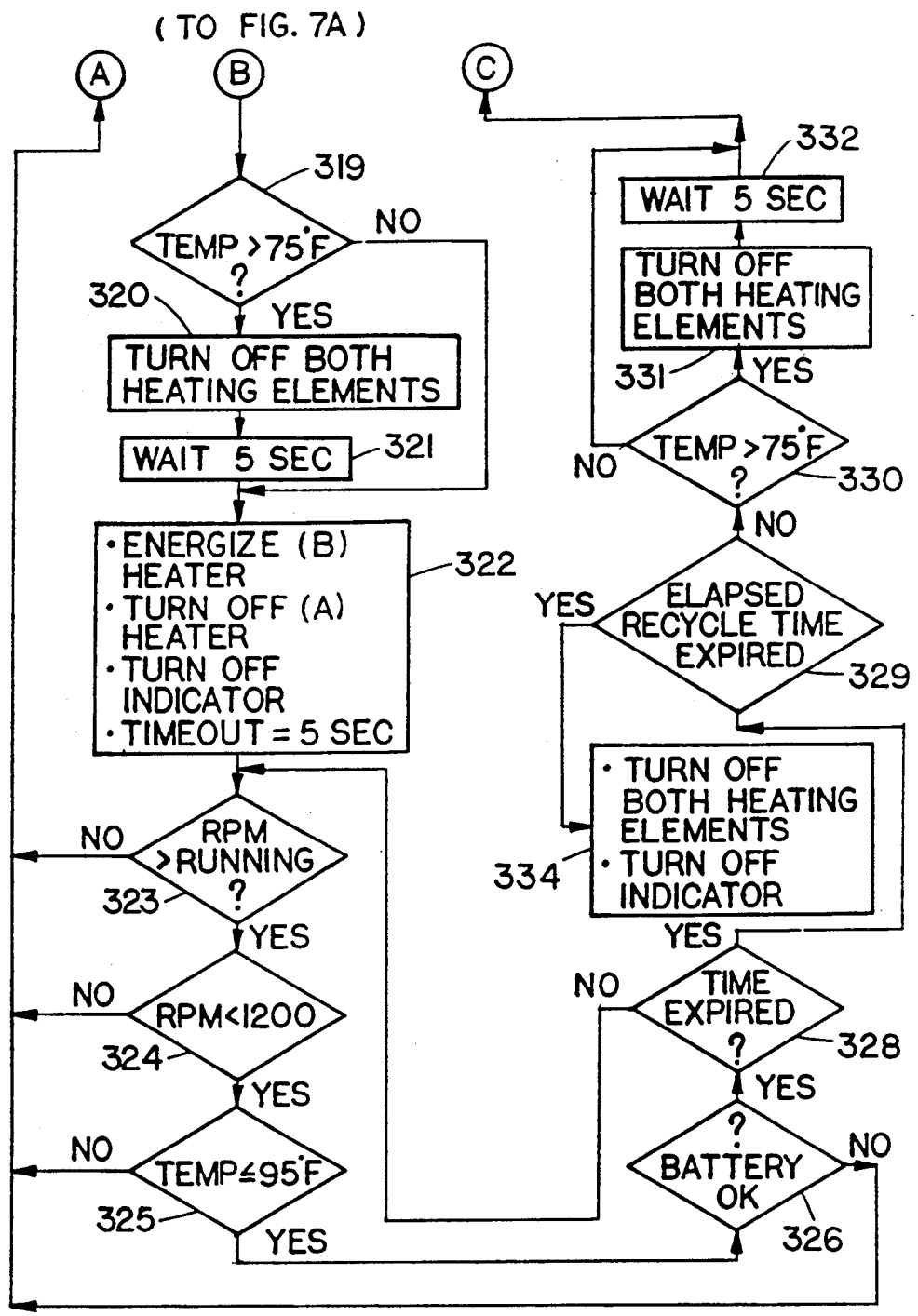
FIG. 7B is a flowchart of a portion of the recycle subroutine of FIG. 3.

Referring now to FIGS. 7A and 7B a more detailed flowchart of the recycle subroutine of step 124 is shown. Program execution begins at step 300 and continues at step 302 where both heating elements are deenergized. Program execution then advances to step 304 where air temperature is tested to determine whether the intake air temperature is less than or equal to 95° F. If the tested temperature is greater than 95° F., the controller waits 0.5 seconds (step 303) and checks the air temperature again. If the air temperature is less than or equal to 95° F., program execution advances to step 306 where the battery condition is tested. If the battery voltage is not within the desired range, program execution returns to step 302.

If the battery voltage is within the desired range, program execution advances to step 307 where engine speed is sensed to detect a running engine. If engine speed is less than a predetermined running limit of 600 RPM, then program execution returns to step 302. Program execution advances to step 308 where engine speed is sensed to detect a speed greater than 1200 RPM. If engine speed is greater than 1200 RPM. If engine speed is greater than 1200 RPM, then program execution returns to step 302.

If engine air inlet temperature is less than 95° F. and battery condition and engine speed are acceptable, the controller resets the elapsed recycle time at step 309. The controller energizes heating element 56 and deenergizes heating element 54 at step 310. Indicator 42 is also extinguished and a timeout value for heating element 56 is set for 5 seconds at step 310. Program execution next advances to step 312 where speed is sensed to ensure a running engine. If engine speed is less than running (600 RPM), the program execution returns to step 302. Program execution advances to step 313 where engine speed is sensed to detect a speed greater than 1200 RPM. If engine speed is greater than 1200 RPM, then program execution advances to step 336 where hysteresis is provided.

The three sensed parameters (air intake temperature, engine speed and battery condition) each have hysteresis loops provided in step 336. For example, when the air temperature exceeds 95° F. (35° C.) at step 314 the heating elements are deenergized, and the temperature must drop below 85° F. (30° C.) before step 302 is executed again. Hysteresis for battery voltage (11.9 volts) and engine speed (1000 RPM) provide similar deenergizing of the heating elements and time delays. The engine speed must drop below 1000 RPM and the battery voltage must exceed 11.9 volts to start recycle again at step 302. After waiting at step 336, program execution returns to step 302.

If at steps 312 and 313 engine speed is greater than 600 RPM but less than 1200 RPM, then program execution advances to step 314 where intake air temperature is tested. If the temperature is greater than 95° F., program execution returns to step 302 after waiting until the intake air temperature falls below the hysteresis temperature at step 336. If air temperature is less than or equal to 95° F., program execution advances to step 316 where the controller senses battery condition. If battery voltage is not within the desired range, program execution returns to step 302 after waiting until the battery voltage exceeds the hysteresis battery voltage at step 336.

The controller determines if time for energizing heating element 56 (5 seconds from step 310) has expired at step 318. If time has not expired, program execution returns to step 312 to test engine speed, air temperature, and battery condition. If time has expired, program execution continues to step 319 to determine whether the 25 percent duty cycle or 50 percent duty cycle is required based on intake air temperature. If intake air temperature is greater than 75° F., program execution advances to step 320 to turn off the heating elements and to step 321 to wait 5 seconds. If intake air temperature is less than or equal to 75° F., program execution advances to step 322 where heating element 54 is energized and heating element 56 is deenergized. The indicator light is also extinguished and a timeout for heating element 54 is set for 5 seconds at step 322. Steps 322 through 328 parallel those of steps 310 through 318, except that at step 328 program execution advances to step 329 to determine whether 20 minutes of continuous recycle has elapsed (timer reset occurred at step 309).

If 20 minutes has elapsed, then program execution ends at step 334. If 20 minutes has not elapsed, program execution advances to step 330 to determine duty cycle based on intake air temperature similar to steps 319 through 321. Program execution returns to step 310 to continue recycling the heating elements. This recycle mode results in the duty cycles depicted in FIG. 2 and FIG. 2A.

Alternatively, the energizing sequence of heaters 54 and 56 could be reversed upon initializing the recycle mode, or the duty cycle could be varied further by changing the timeout values determining the amount of time (duration) the heating elements are energized and/or by changing the wait period at steps 321 and 332 where both heating elements are deenergized.

Figure 8:
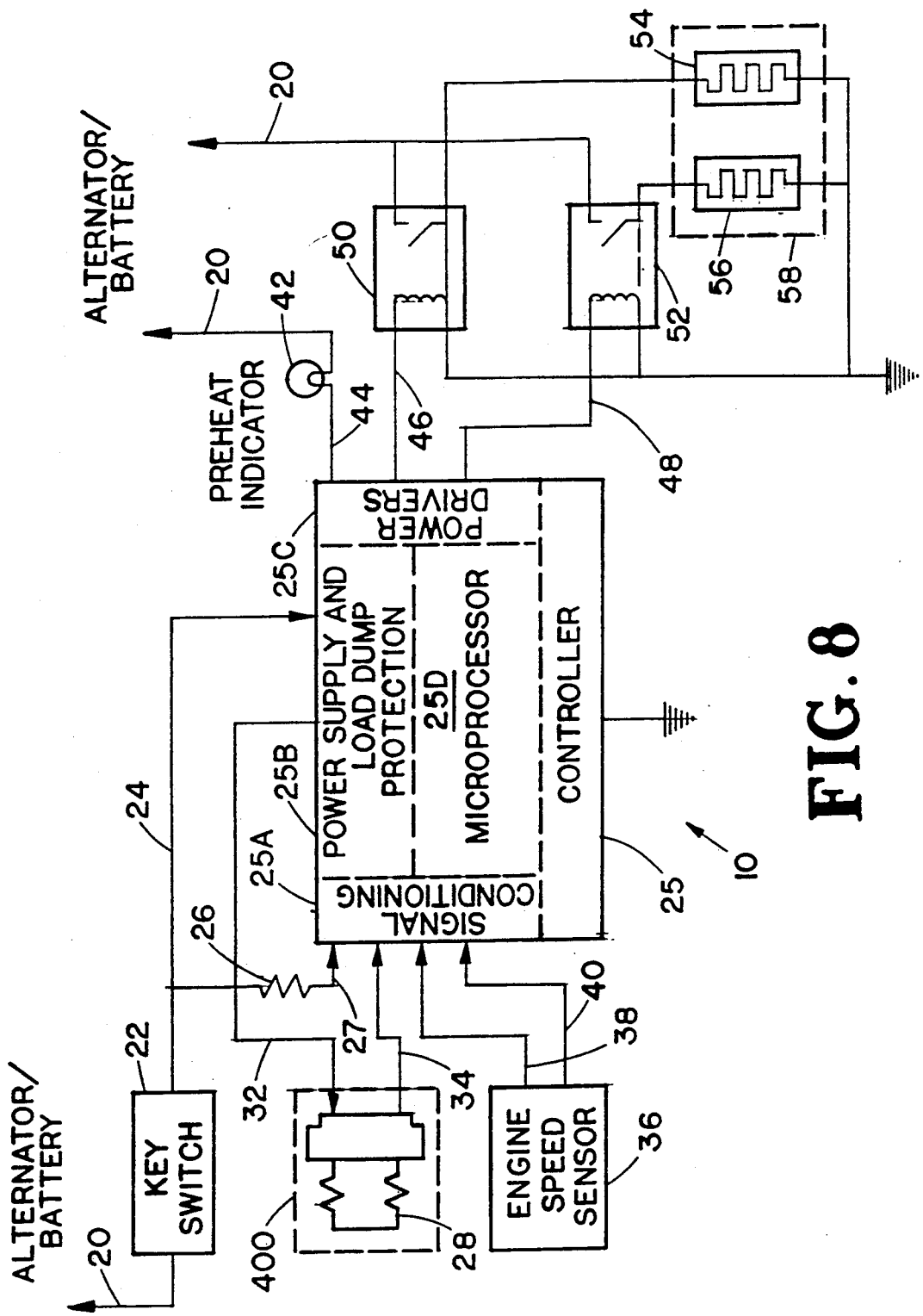
FIG. 8 is a diagrammatic illustration of another embodiment of an air intake heating system according to the present invention.

Other embodiments of the air intake heating system according to the present invention are also contemplated. For example, the preheat indicator is not required for system operation, and therefore may be made optional at installation. Further, as depicted in FIG. 8, thermistor 28 can be located in an engine water jacket 400 as represented by the dashed line. The thermistor in this alternate embodiment would sense engine coolant temperature rather than air intake temperature, with the remaining software, circuitry, and operational parameters paralleling those described in FIG. 1.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An air intake heating system for use with an internal combustion engine having a battery and corresponding charging system, said air intake heating system comprising:

(a) temperature monitoring means for monitoring intake manifold air temperature, said temperature monitoring means producing a temperature signal corresponding to the intake manifold air temperature;

(b) engine speed monitoring means for monitoring rotational speed of said engine, said engine speed monitoring means producing an engine speed signal corresponding to the rotational speed of said engine;

(c) electrical air intake heating means for heating intake manifold air;

(d) first circuit means responsive to said temperature signal and said speed signal, said first circuit means producing a first heating signal when said temperature signal is below a predetermined preheat limit and said speed signal is below a predetermined cranking limit;

(e) second circuit means responsive to said temperature signal and said speed signal, said second circuit means producing a second heating signal when said temperature signal is below a predetermined postheat limit and said speed signal is above a predetermined running limit;

(f) third circuit means responsive to said temperature signal and said speed signal, said third circuit means producing a third heating signal when said temperature signal is below a predetermined recycle limit and said speed signal is above a predetermined running limit; and (g) fourth circuit means responsive to said first, second and third heating signals, said fourth circuit means supplying a power signal from said battery to said electrical air intake heating means in response to said first, second and third heating signals.

2. The air intake system of claim 1 wherein said first, second and third circuit means produce and first, second and third heating signals respectively when voltage of said battery is within a predetermined voltage range.

3. The air intake system of claim 2 wherein said first heating signal is of variable duration based upon said temperature signal.

4. The air intake system of claim 3 wherein said third heating signal has a duty cycle and said fourth circuit means is responsive to said duty cycle, said fourth circuit means supplying a power signal from said battery to said electrical air intake heating means in accordance with said duty cycle.

5. The air intake system of claim 4 wherein said third heating signal is of variable duty cycle based upon said temperature signal.

6. The air intake system of claim 5 wherein said first, second and third circuit means produce said first, second and third heating signals respectively when said speed signal is below a predetermined warmed engine limit.

7. The air intake system of claim 6 wherein said first, second, third and fourth circuit means are combined into a single chip microprocessor having input means for monitoring said temperature signal, engine speed signal and battery voltage, said microprocessor further having output means for connecting said air intake heating means to said battery.

8. The air intake system of claim 7 wherein said microprocessor includes analog to digital converter means for monitoring said temperature signal, engine speed signal and battery voltage.

9. An air intake heating system for use with an internal combustion engine having a battery and corresponding charging system, said air intake heating system conmprising:
(a) temperature monitoring means for monitoring intake manifold air temperature, said temperature monitoring means producing a temperature signal corresponding to the intake manifold air temperature;
(b) engine speed monitoring means for monitoring rotational speed of said engine, said engine speed monitoring means producing an engine speed signal corresponding to the rotational speed of said engine;
(c) electrical air intake heating means for heating intake manifold air; and
(d) electronic control means for controlling system functions, said battery supplying a power signal to said electronic control means, said electronic control means connected to said temperature signal and said speed signal and including;
a first mode wherein said electronic control means responds to said temperature signal and said speed signal by supplying a first heating signal to said electrical air intake heating means when said temperature signal is below a predetermined preheat limit and said speed signal is below a predetermined cranking limit;
a second mode wherein said electronic control means responds to said temperature signal and said speed signal by supplying a second heating signal to said electrical air intake heating means when said temperature signal is below a predetermined posthead limit and said speed signal is above a predetermined running limit; and
a third mode wherein said electronic control means repsonds to said temperature signal and said speed signal by supplying a third heating signal to said electrical air intake heating means when said temperature signal is below a predetermined recycle limit and said speed signal is above a redetermined running limit.

10. The air intake system of claim 9 wherein said first heating signal is of variable duration based upon said temperature signal.

11. The air intake system of claim 10 wherein said third heating signal is of variable duty cycle based upon said temperature signal.

12. The air intake system of claim 11 wherein said first, second and third circuit means produce said first, second and third heating signals respectively when said speed signal is below a predetermined warmed engine limit.

13. The air intake system of claim 12 wherein said electronic control means is a microprocessor having digital input and output means.

14. The air intake system of claim 13 wherein said microprocessor iñcludes analog to digital converter means.

15. The air intake system of claim 14 wherein said electrical air intake heating means includes a first and second heating element, said first, second and third heating signals supplied to said first heating element, said microprocessor producing a fourth, fifth and sixth heating signal, said fourth heating signal supplied to said second heating element when said temperature signal is below a predetermined preheat limit and said speed signal is below a predetermined cranking limit, said fourth heating signal having a variable duration corresponding to said temperature signal, said fifth heating signal supplied to said second heating element when said temperature signal is below a predetermined postheat limit and said speed signal is above a predetermined running limit, and said sixth heating signal supplied to said second heating element when said temperature signal is below a predetermined recycle limit and said speed signal is above a predetermined running limit, said sixth heating signal having a variable duty cycle based upon said temperature signal.

16. The air intake system of claim 15 wherein said third heating signal has an on/off duty cycle and said sixth heating signal has an off/on duty cycle so that said first and second heating elements are alternately switched on and off.

17. The air intake system of claim 16 wherein said electronic control means produces said first through sixth heating signals when voltage of said battery is within a predetermined range.

18. The air intake system of claim 17 further comprising key switch means for starting and stopping said engine, said key switch means having at least an "on" and an "off" position, said key switch means connecting said battery to said microprocessor when placed in the "on" position, said microprocessor responding to said key switch means being moved from the "off" position to the "on" position by supplying said first and fourth heating signals to said first and second heating elements respectively when said intake manifold air temperature is below said predetermined preheat limit, said engine speed signal is below said predetermined cranking limit, and said battery voltage is within said predetermined range.

19. The air intake system of claim 18 wherein said microprocessor responds to said key switch means being moved from the "off" position to the "on" position by supplying said second and fifth heating signals to said first and second heating elements respectively when said intake manifold air temperature is below said predetermined postheat limit, said engine speed signal is above said predetermined running limit, and said battery voltage is within said predetermined range.

20. The air intake system of claim 19 wherein said microprocessor responds to said key switch means being moved from the "off" position to the "on" position by supplying said third and sixth heating signals to said first and second heating elements respectively when said intake manifold air temperature is below said predetermined recycle limit, said engine speed signal is above said predetermined running limit, and said battery voltage is within said predetermined range.

21. A method for heating intake manifold air of an internal combustion engine having a battery and corresponding charging system, comprising the steps of:
   (a) sensing intake manifold air temperature;
   (b) sensing rotational speed of said engine;
   (c) heating said intake manifold air when said sensed air temperature is below a predetermined preheat temperature and said sensed speed is below a predetermined cranking speed;
   (d) heating said intake manifold air when said sensed air temperature is below a predetermined postheat temperature and said sensed speed is above a predetermined running speed;
   (e) heating said intake manifold air when said sensed temperature is below a predetermined recycle limit and said sensed speed is above a predetermined running speed.

22. The method of claim 21 wherein said intake manifold air is heated when voltage of said battery is within a predetermined range.

23. The method of claim 22 wherein said heating of said intake manifold air is of variable duration based upon said sensed air temperature when said sensed air temperature is below a predetermined preheat temperature and said sensed speed is below a predetermined cranking speed.

24. The method of claim 23 wherein said heating of said intake manifold air is of variable duty cycle based upon said sensed temperature during subsequent engine operation.

25. The method of claim 24 wherein said intake manifold air is heated when said sensed speed is below a predetermined warmed engine speed.

26. An intake air heater system for use with an internal combustion engine comprising:
   (a) electrical air intake heater means for heating intake manifold air;
   (b) temperature monitoring means for monitoring engine coolant temperature, said temperature monitoring means producing a temperature signal corresponding to engine coolant temperature;
   (c) engine speed monitoring means for monitoring rotational speed of said engine, said engine speed monitoring means producing an engine speed signal corresponding to the rotational speed of said engine;
   (d) key switch means for starting and stopping said engine, said key switch means producing a key signal indicating position of said key switch means;
   (e) electronic control means for controlling system functions, said control means having a first input, a second input, a third input and first heater control means for supplying a power output signal to said air intake heater means, said temperature signal supplied to said first input, said speed signal supplied to said second input, and said key signal supplied to said third input, said control means being designed and arranged to respond to said key switch means by:
      activating said heater output means when said key switch means is activated if said temperature signal indicates engine coolant temperature is below a predetermined preheat limit and said speed signal indicates said engine rotational speed is below a predetermined cranking limit;
      activating said heater output means when said key switch means is activated if said temperature signal indicates engine coolant temperature is below a predetermined postheat limit and said speed signal indicates engine speed is above a predetermined running limit; and
      repetitively activating and deactivating said heater output means when said key switch means is activated if said temperature signal indicates engine coolant temperature is below a predetermined recycle limit and said speed signal indicates said engine coolant temperature is above a predetermined running limit; and
   (f) power supply means for supplying electrical power to said control means and said electrical air intake heater means.

27. The air intake heater system of claim 26 wherein said electronic control means is a microprocessor having digital input and output means and analog to digital converter input means.

28. The air intake heater system of claim 27 wherein said key switch means has an "off" position, an "on" position, and a "start" position.

29. The air intake heater system of claim 28 wherein said electrical air intake heater means includes a first and a second heating element and said electronic control means includes a second heater control means, said first heater control means connected to said first heating element and said second heater control means connected to said second heating element, said electronic control means activating said first and second heater control means when said key switch is activated if said temperature signal indicates engine coolant temperature is below a predetermined preheat limit and said speed signal indicates said engine rotational speed is below a predetermined cranking limit.

30. The air intake heater system of claim 29 wherein said electronic control means activates said first and second heater control means when said key switch is activated if said temperature signal indicates engine coolant temperature is below a predetermined postheat limit and said speed signal indicates engine speed is above a predetermined running limit.

31. The air intake heater system of claim 30 wherein said electronic control means alternates activating and deactivating said first and second heater control means according to a variable duty cycle based upon said temperature signal when said key switch means is activated if said temperature signal indicates engine coolant temperature is below a predetermined recycle limit and said speed signal indicates said engine coolant temperature is above a predetermined running limit.

32. The air intake system of claim 31 wherein said electronic control means activates said first and second heater control means when voltage of said battery is within a predetermined range.

33. The air intake system of claim 32 wherein said electronic control means activates said first and second heater control means when said temperature signal is below a warmed engine temperature limit.

34. The air intake system of claim 32 wherein said electronic control means activates said first and second heater control means when said speed signal is below a warmed engine speed limit.

* * * * *

UNITED STATES PATENT AND TRADEMARK OFFICE
CERTIFICATE OF CORRECTION

PATENT NO. : 5,094,198
DATED : March 10, 1992
INVENTOR(S) : Paul M. Trotta, et al.

It is certified that error appears in the above-indentified patent and that said Letters Patent is hereby corrected as shown below:

In column 16, line 31, please replace "coolant temperature" with --speed--.
In column 17, lines 2-3, please replace "coolant temperature" with --speed--.
In column 17, line 6, please replace "voltage of said battery" with --electrical power from said power supply means--.

Signed and Sealed this

Twelfth Day of July, 1994

Attest:

BRUCE LEHMAN

Attesting Officer
Commissioner of Patents and Trademarks